United States Patent
Edington

(10) Patent No.: US 11,959,590 B2
(45) Date of Patent: Apr. 16, 2024

(54) METHOD AND DEVICE FOR CLEARING VEHICLE ACCIDENTS

(71) Applicant: Lee Edington, Terre Haute, IN (US)

(72) Inventor: Lee Edington, Terre Haute, IN (US)

(*) Notice: Subject to any disclaimer, the term of this patent is extended or adjusted under 35 U.S.C. 154(b) by 573 days.

(21) Appl. No.: 17/126,293

(22) Filed: Dec. 18, 2020

(65) Prior Publication Data

US 2021/0388944 A1 Dec. 16, 2021

Related U.S. Application Data

(60) Provisional application No. 63/039,182, filed on Jun. 15, 2020.

(51) Int. Cl.
| | | |
|---|---|---|
| *B62D 27/06* | (2006.01) | |
| *B62D 27/04* | (2006.01) | |
| *F16N 31/00* | (2006.01) | |
| *F16N 31/02* | (2006.01) | |

(52) U.S. Cl.
CPC .......... *F16N 31/006* (2013.01); *B62D 27/04* (2013.01); *B62D 27/06* (2013.01); *F16N 31/02* (2013.01)

(58) Field of Classification Search
CPC ...... F16N 31/006; F16N 31/02; F16N 31/002; B62D 27/04; B62D 27/06
USPC .......................................................... 296/38
See application file for complete search history.

(56) References Cited

U.S. PATENT DOCUMENTS

| | | | |
|---|---|---|---|
| 3,980,153 A * | 9/1976 | Andrews | F16N 31/006 180/69.1 |
| 5,417,310 A | 5/1995 | Halseth | |
| 6,189,721 B1 | 2/2001 | Bishop | |
| 7,537,259 B2 | 5/2009 | Hannigan | |
| D769,342 S | 10/2016 | Picazo | |
| 2007/0029336 A1* | 2/2007 | Posada | F16N 31/002 220/573 |
| 2013/0206251 A1* | 8/2013 | Harr | B65B 5/04 53/429 |
| 2021/0404602 A1* | 12/2021 | Luna | F16N 31/00 |

FOREIGN PATENT DOCUMENTS

| | | | | |
|---|---|---|---|---|
| GB | 2573615 A * | 11/2019 | | B60S 5/00 |
| WO | WO-2019081248 A1 * | 5/2019 | | B01J 20/26 |

* cited by examiner

*Primary Examiner* — Pinel E Romain
(74) *Attorney, Agent, or Firm* — Gardner, Linn, Burkhart & Ondersma LLP

(57) ABSTRACT

A method of transporting a vehicle that has a ruptured fluid container from an accident includes affixing a fluid absorbent diaper to the vehicle at the location of the ruptured fluid container. The diaper has an absorbent planar member being at least about half the size of the vehicle undercarriage and a plurality of spaced bungee straps extending from edge portions of the member. The vehicle can then be transported and/or stored without risk of spillage of hydrocarbon fluid or battery acid.

16 Claims, 5 Drawing Sheets

METHOD AND DEVICE FOR CLEARING VEHICLE ACCIDENTS

CROSS REFERENCE TO RELATED APPLICATION

The present application claims priority of U.S. provisional application Ser. No. 63/039,182 filed Jun. 15, 2020, which is hereby incorporated herein by reference in its entirety.

BACKGROUND AND FIELD OF THE INVENTION

The present invention is directed to a method of transporting a vehicle that has a ruptured fluid container from an accident and a spill absorbent diaper for use with such method.

It is estimated there are over 16,000 vehicle accident per day. A rough estimate is that about half will result in significant amount of hydrocarbon fluid leakage. A standard passenger motor vehicle contains about 51 gallons of hydrocarbons in its gasoline, antifreeze, motor oil, transmission fluid, brake fluid and power steering fluid. Since one gallon of hydrocarbon can seriously contaminate up to one million gallons of open water, vehicle accidents are a major risk to the environment and public health.

SUMMARY OF THE INVENTION

States have spill and cleanup statutes that require a person who tows a vehicle from an accident scene to remove from the street all solid debris and liquid waste, including but not limited to oil, transmission fluid, brake fluid or the like. When a vehicle has a breached container, such as a gas tank, oil pan, radiator or the like, it leaks foreign fluids at the accident scene. However, not all leakage is restricted to the accident scene. Fluids can continue to spill the entire distance to the impound lot and while stored at the impound lot and at the salvage facility. This creates a legal liability due to contamination for the tow operator and diminished property value at the impound lot, salvage facility, adjacent properties who may experience runoff and pubic roadways.

A method of transporting a vehicle that has a ruptured fluid container from an accident, according to an aspect of the invention, includes affixing a fluid absorbent diaper to the vehicle at the location of the ruptured fluid container. The diaper has an absorbent planar member being at least about half the size of the vehicle undercarriage and a plurality of spaced bungee straps extending from edge portions of the member. The vehicle can then be transported and/or stored without risk of spillage of hydrocarbon fluid.

The planar member may be is generally rectilinear with at least two parallel bungee straps extending from a first edge portion of the planar member and at least two perpendicular bungee straps each extending in opposite directions from second and third edge portions adjacent the first edge portion. The bungee straps may be each anchored at a common edge portion to the planar member.

The diaper may be affixed to the vehicle with the parallel bungee straps engaging an end portion of the vehicle and the perpendicular bungee straps engaging opposite wheel wells adjacent the end portion. If the ruptured fluid container is the gas tank the diaper may be affixed using the perpendicular bungee straps engaging the rear portion of the vehicle. If the ruptured fluid container is the radiator, the oil pan and/or the transmission the diaper may be affixed using the perpendicular bungee straps engaging the front portion of the vehicle.

The absorbent plane may be made from at least two layers of absorbent mats joined together with the bungee straps captured at the mats. The mats may be made from polypropylene, preferably recycled. The bungee straps may be anchored at a common edge portion of said planar member.

Other objects features and advantages will be apparent when viewing the description in combination with the drawings, in which:

DETAILED DESCRIPTION OF THE PREFERRED EMBODIMENT

Figure 1:
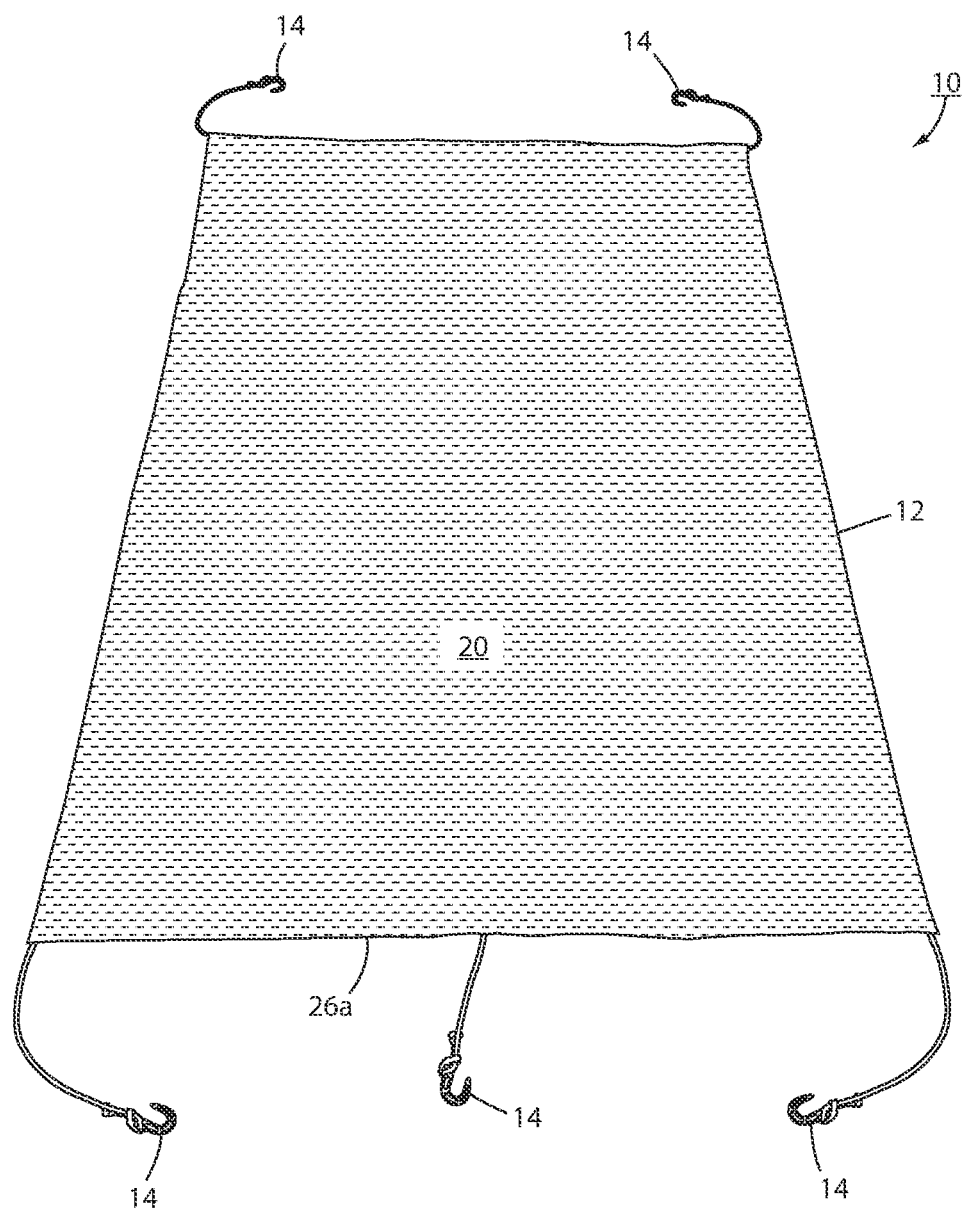
FIG. 1 is a top plan view of a fluid absorbent diaper according to an embodiment of the invention.
Figure 2:
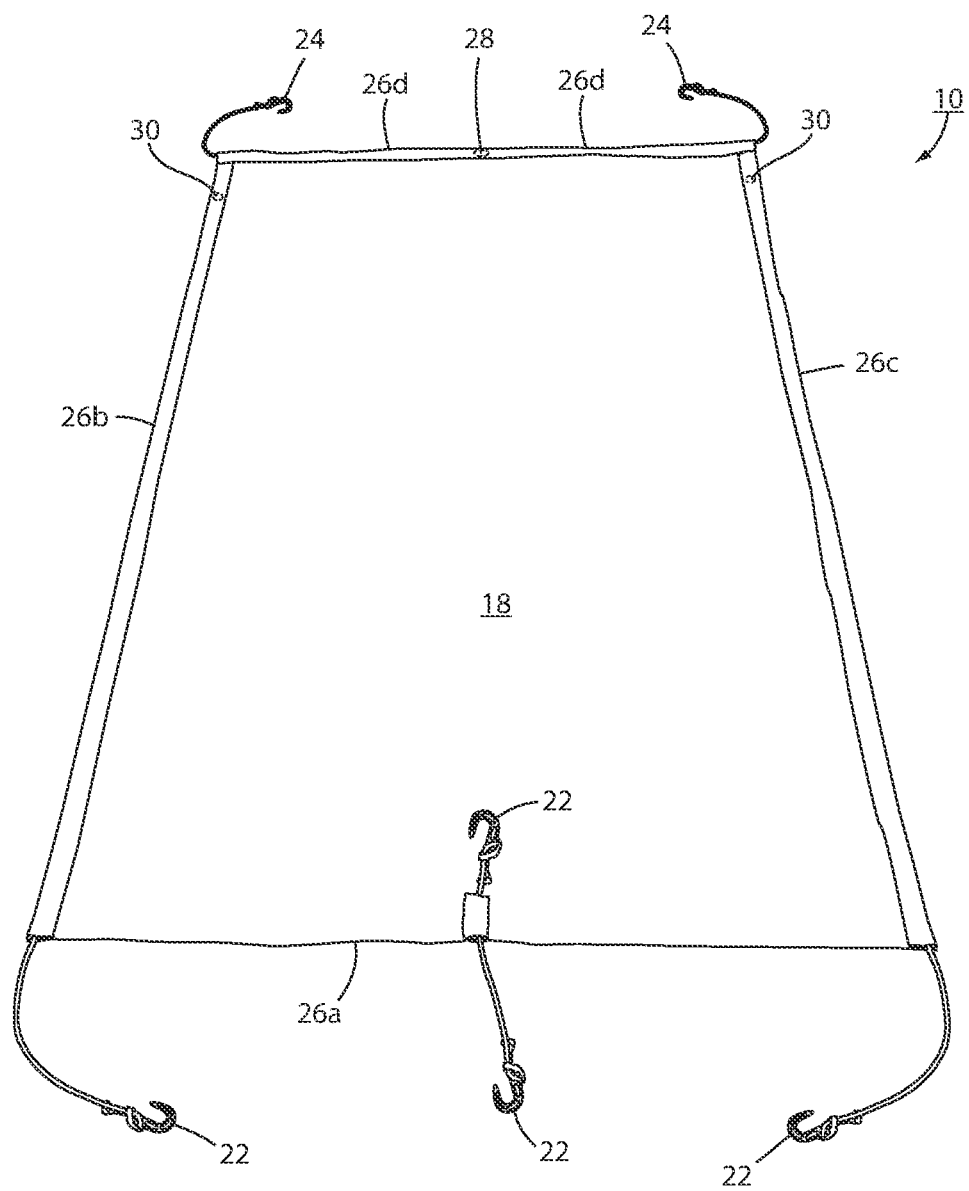
FIG. 2 is a bottom plan view of the fluid absorbent diaper in FIG. 1.

Referring now to the drawings and the illustrative embodiments depicted therein, a method 5 of transporting a vehicle having a front portion 8a and rear portion 8b that has a ruptured fluid container, such as a gas tank, radiator, oil pan, transmission or the like, from an accident includes affixing a fluid absorbent diaper 10 to the vehicle at the location of the ruptured fluid container. The vehicle with the diaper affixed can then be transported on a flat-bed truck or tow-truck or the like to the impound lot or salvage facility with fluid spilled from the ruptured container being absorbed by diaper 10 and thereby contained. The fluid spill is contained both during transport and while the wrecked vehicle is being stored. The term "vehicle" is intended to include gas powered and electric powered passenger cars, SUVs and pickup trucks as well as heavy duty trucks, construction equipment and various other forms of transportation vehicles.

The diaper has an absorbent planar member 12 having a plurality of spaced nylon bungee straps 14 extending from edge portions 26 of member 12. The term "bungee straps" is intended to include bungee cords, ratchets, pull straps or the like. Absorbent planar member 12 is generally rectilinear in shape being about half the size of the vehicle undercarriage. This size allows two of the bungee straps 24 to be positioned to enter the wheel wells on the respective end of the vehicle while the bungee straps 22 wrap around the bumper at the end of the vehicle and capture an edge of a gap. In the illustrated embodiment, planar member 12 is 5 feet in width and 6 feet in length. However, other dimensions are possible and other shapes could be used. Absorbent plane member 12 is made of two layers of absorbent mats, bottom mat 18 and top mat 20, joined together such as with stitching, adhesive or other form of joining, with bungee straps 14 captured along edges of the mats. In the illustrated embodiment, mats 18, 20 are each made of between about 4 and 8 layers of thermally bonded melt-blown polypropylene, preferably recycled polypropylene. As illustrated, the first layer is a polypropylene absorbent this is purposed for absorbing antifreeze. The second layer is a spun-bond that is adapted to absorb oil and other hydrocarbon fluids. The third layer is an oil—only polypropylene cellulosic material for super absorbency of hydrocarbon fluids. The fourth layer is polypropylene sheeting for weather barrier.

Diaper 10 can absorb up to about 28 gallons of hydrocarbons while allowing water to pass through. For electric vehicles, where the ruptured fluid container may be batteries and the spilled fluid may be battery acid, diaper 12 will be made from a pink hazmat absorbent planar material which will neutralize and absorb the battery acid.

At least two of the bungee straps 14 are parallel bungee straps 22 that extend from a first edge portion 26*a* of planar member 12 and at least two of the bungee straps are perpendicular bungee straps 24 each extending in opposite directions from a second edge portion 26*b* and a third edge portion 26*c* that are adjacent to a fourth first edge portion 26*d* that is opposite first edge portion 26*a*. Perpendicular bungee straps 24 are anchored together, such as by sewing, at a common anchor point 28 adjacent edge portion 26*d* of planar member 12. Parallel bungee straps 22 are each anchored at a respective anchor point 30 such as by sewing. Anchor points 28 and 30 are close together adjacent fourth edge portion 26*d* of the planar member 12 in order to reduce amount of stress applied the length of planar member 12 from mounting forces applied to bungee straps 24. Mounting points 28, 30 could be at a common location.

Figure 3:
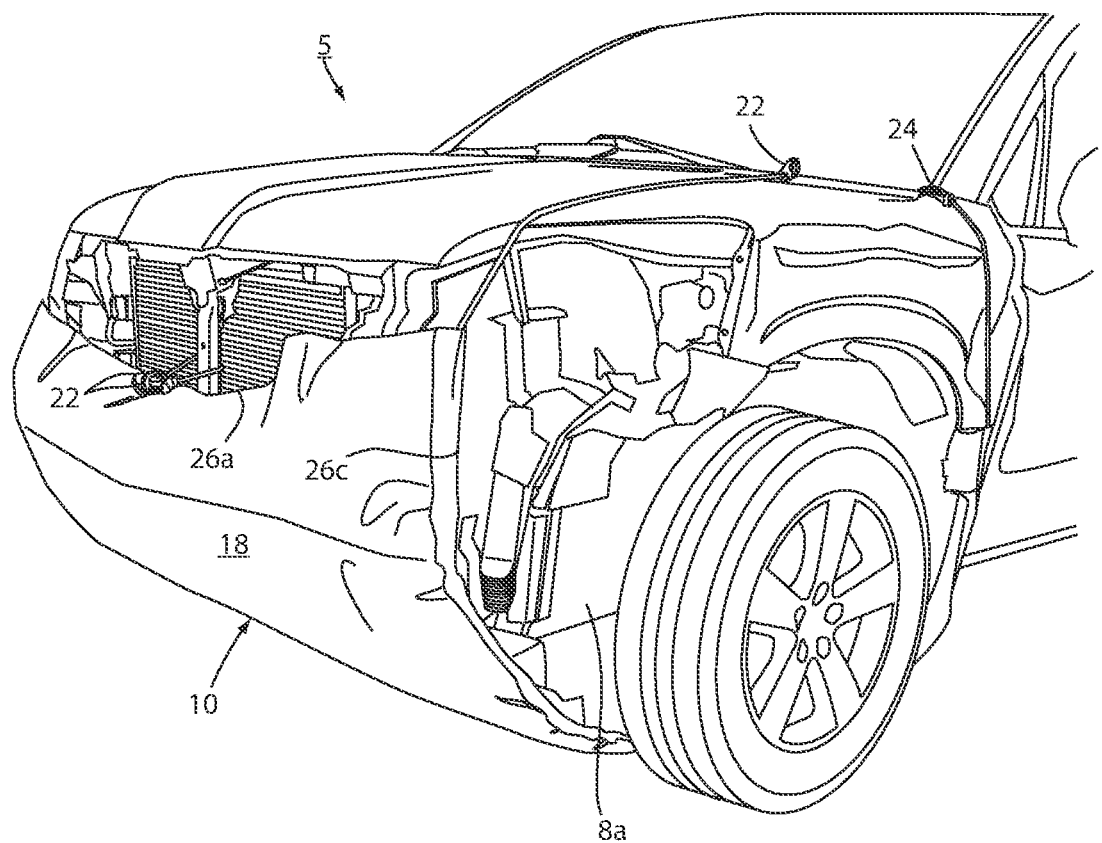
FIG. 3 is a perspective view taken from the front and side of a vehicle involved in an accident in the front thereof prepared for transportation according to an embodiment of the invention.
Figure 4:
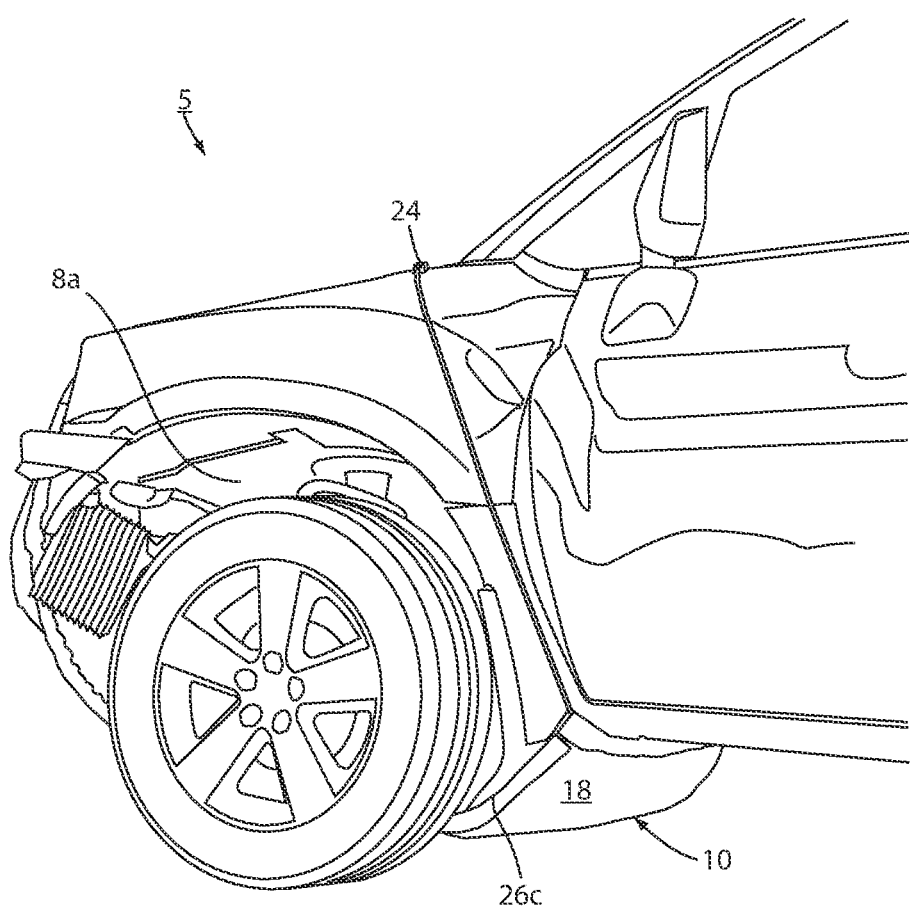
FIG. 4 is a perspective view of the vehicle in FIG. 3 taken from the side thereof.
Figure 5:
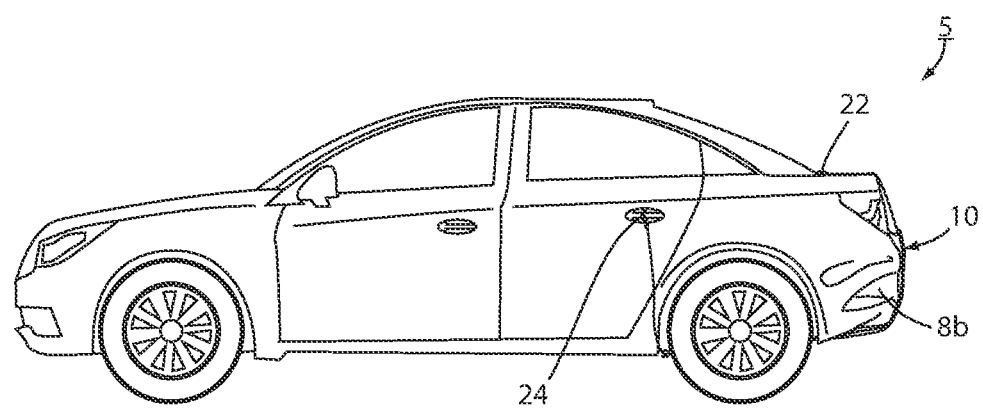
FIG. 5 is a side elevation view of a vehicle involved in an accident in the rear thereof prepared for transportation according to an embodiment of the invention.

In order to prevent spills of hydrocarbons from a vehicle that has a ruptured fluid container from an accident, a fluid absorbent diaper 10 is spread out on the ground under the vehicle ruptured fluid container. The diaper is affixed to the vehicle with parallel bungee straps 22 engaging an end portion of the vehicle. Perpendicular bungee straps 24 engage opposite wheel wells of the vehicle adjacent the vehicle end portion. If the ruptured fluid container is the radiator, the oil pan, the transmission or the like the diaper is affixed to the front of the vehicle 8*a* as shown in FIGS. 3 and 4. The parallel bungee straps 22 engaging the front portion of the vehicle such as the grill, hood or the like. If the ruptured fluid container is the gas tank, the diaper is affixed to the rear of the vehicle 8*b* as shown in FIG. 5. The parallel bungee straps engage the rear portion of the vehicle such as the bumper, trunk or the like and the perpendicular bungee straps engage the rear wheel wells.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of transporting a vehicle that has a ruptured fluid container from an accident, the ruptured fluid container having a location, the vehicle having a vehicle undercarriage and a size, the method comprising:
   providing a fluid absorbent diaper, the diaper having an absorbent planar member being at least half the size of the vehicle undercarriage and having a plurality of spaced bungee straps extending from edge portions of the absorbent planar member;
   affixing the diaper to the vehicle at the location of the ruptured fluid container using the bungee straps; and
   transporting the vehicle
   wherein the vehicle comprises an electric vehicle and wherein the absorbent planar member comprises at least two layers of acid absorbent mats jointed together with the bungee straps captured at the absorbent planar member.

2. The method as claimed in claim 1 wherein said providing a fluid absorbent diaper includes providing a generally rectilinear absorbent planar member with at least two parallel bungee straps extending from a first edge portion of the generally rectilinear absorbent planar member and at least two perpendicular bungee straps each extending in opposite directions from second and third edge portions adjacent the first edge portion.

3. The method as claimed in claim 2 further comprising anchoring each of the bungee straps at a common edge portion to the generally rectilinear absorbent planar member.

4. The method as claimed in claim 2 including affixing the fluid absorbent diaper to the vehicle with the parallel bungee straps by engaging an end portion of the vehicle and the perpendicular bungee straps engaging opposite wheel wells adjacent the end portion.

5. The method as claimed in claim 4 wherein the vehicle has a rear portion and the ruptured fluid container comprises a gas tank, and said affixing comprises the perpendicular bungee straps engaging the rear portion of the vehicle.

6. The method as claimed in claim 4 wherein the ruptured fluid container comprises at least one selected from a radiator, an oil pan and a transmission, and said affixing comprises engaging the perpendicular bungee straps with a front portion of the vehicle.

7. The method as claimed in claim 1 wherein said providing a fluid absorbent diaper comprises providing the generally rectilinear absorbent planar member with at least two layers of hydrocarbon absorbent mats joined together with the bungee straps captured at the generally rectilinear absorbent planar member.

8. The method as claimed in claim 7 wherein said providing a fluid absorbent diaper includes providing the mats with multiply layers of polypropylene.

9. The method as claimed in claim 1 wherein said method comprises transporting a vehicle that has a ruptured fluid container containing an oil-based fluid.

10. The method as claimed in claim 1 wherein said method comprises transporting a vehicle that has a ruptured fluid container containing.

11. The method as claimed in claim 1 wherein said providing the fluid absorbent diaper includes providing the absorbent planar member with a size of half the size of the vehicle undercarriage.

12. A vehicle fluid spill absorbent diaper, for a vehicle that has a ruptured fluid container, the vehicle having a vehicle undercarriage and a size, said vehicle fluid spill absorbent diaper comprising:
   an absorbent planar member having at least two edge portions and being at least about half the size of the vehicle undercarriage and having a plurality of spaced bungee straps extending from said at least two two edge portions of the absorbent planar member, said bungee straps configured to affix said absorbent planar member to the vehicle at a location of the ruptured fluid container; and said absorbent planar member comprising at least two layers of acid-absorbent mats joined together with said bungee straps captured at the absorbent planar member.

13. The vehicle fluid spill absorbent diaper as claimed in claim 12 wherein said absorbent acid-absorbent mats hydrocarbon and pass water.

14. The vehicle fluid spill absorbent diaper as claimed in claim 13 wherein said bungee straps are anchored at a common edge portion of said absorbent planar member.

15. The vehicle fluid spill absorbent diaper as claimed in claim 12 wherein said bungee straps are anchored at a common edge portion of said absorbent planar member.

16. The vehicle fluid spill absorbent diaper as claimed in claim 12 wherein said absorbent planar member is half the size of the vehicle undercarriage.

\* \* \* \* \*

UNITED STATES PATENT AND TRADEMARK OFFICE
CERTIFICATE OF CORRECTION

PATENT NO. : 11,959,590 B2
APPLICATION NO. : 17/126293
DATED : April 16, 2024
INVENTOR(S) : Lee Edington Page 1 of 1

It is certified that error appears in the above-identified patent and that said Letters Patent is hereby corrected as shown below:

In the Specification

Column 1
Line 44, "pubic" should be --public--

Column 3
Line 5, "oil-only" should be --oil only--

In the Claims

Column 4
Claim 1, Line 3, "acid absorbent mats jointed" should be --acid-absorbent mats joined--
Claim 10, Line 44, "containing." should be --containing battery acid.--
Claim 12, Line 49, "diaper, for" should be --diaper for--
Claim 13, Lines 66-67, "said absorbent acid-absorbent mats hydrocarbon and" should be --said acid absorbent mats absorb hydrocarbon and--

Signed and Sealed this
Twenty-fifth Day of March, 2025

Coke Morgan Stewart
*Acting Director of the United States Patent and Trademark Office*